US012464277B2

(12) United States Patent
Seo et al.

(10) Patent No.: US 12,464,277 B2
(45) Date of Patent: Nov. 4, 2025

(54) AIR FLOW CONTROL VALVE STRUCTURE FOR AUDIO DEVICE

(71) Applicant: BUJEON CO., LTD., Ansan-si (KR)

(72) Inventors: Donghyun Seo, Ansan-si (KR); Minkoo Park, Hwaseong-si (KR)

( * ) Notice: Subject to any disclaimer, the term of this patent is extended or adjusted under 35 U.S.C. 154(b) by 148 days.

(21) Appl. No.: 18/600,919

(22) Filed: Mar. 11, 2024

(65) Prior Publication Data

US 2024/0314485 A1 Sep. 19, 2024

(30) Foreign Application Priority Data

Mar. 13, 2023 (KR) ........................ 10-2023-0032503

(51) Int. Cl.
*H04R 1/10* (2006.01)
*H04R 3/00* (2006.01)

(52) U.S. Cl.
CPC ......... *H04R 1/1041* (2013.01); *H04R 1/1016* (2013.01); *H04R 2420/07* (2013.01); *H04R 2460/11* (2013.01)

(58) Field of Classification Search
CPC ........................... H04R 1/1041; H04R 1/1016; H04R 2420/07; H04R 2460/11
USPC .................................................... 381/74, 122
See application file for complete search history.

(56) References Cited

U.S. PATENT DOCUMENTS

2018/0091892 A1* 3/2018 Taylor .................. H04R 1/2826

FOREIGN PATENT DOCUMENTS

| | | | |
|---|---|---|---|
| KR | 10-2018-0033056 | A | 4/2018 |
| KR | 10-2021-0134194 | A | 11/2021 |
| KR | 10-2358786 | B1 | 2/2022 |

* cited by examiner

*Primary Examiner* — Ammar T Hamid
(74) *Attorney, Agent, or Firm* — KORUS Patent, LLC; Seong Il Jeong

(57) ABSTRACT

The present invention provides an audio device that can selectively allow and block the vent flow of external sound using an air flow control valve mechanism and can finely control the amount of opening.

8 Claims, 8 Drawing Sheets

AIR FLOW CONTROL VALVE STRUCTURE FOR AUDIO DEVICE

CROSS-REFERENCE TO RELATED APPLICATION

This application claims the benefit of Korean Patent Application No. 10-2023-0032503 filed on Mar. 13, 2023, which is hereby incorporated by reference herein in its entirety.

BACKGROUND

1. Technical Field

The present invention relates to an air flow control valve structure for an audio device. More specifically, the present invention relates to an audio device equipped with an air flow control valve that can selectively open and close a passage to block or allow external sound and can adjust the quantity of air flow. The valve structure of the present invention is particularly suitable for true wireless stereo (TWS).

2. Description of the Related Art

A sound signal transmitted from an external electronic device is converted into vibration through the driver of an earphone equipped with a micro-speaker and this vibration is transmitted through a user's external auditory canal. Accordingly, a user can hear a variety of types of sound, including music, voice, and/or the like. For a wide sound range and excellent sound quality, external noise needs to be prevented from entering the earphone.

However, during daily life or social activities, there are many cases where a user has to listen to the sound transmitted through an earphone and external sound at the same time. These cases correspond to a case where someone calls a user or a user receives a phone call from the outside, a case where a user wants to enjoy music and the sound of nature around him or her at the same time, and a case where a user needs to hear the driving sound of a car to prevent danger on a road. In this case, the state in which external sound is transmitted through the earphone, i.e., a so-called transparency mode, needs to be maintained.

Among currently commercialized products, there are known products in which a user can select an anti-noise cancelling (ANC) mode or a transparency mode through a program of a mobile phone, but most of them add electronic elements such as a filter and a resistor thereto and rely on their physical properties.

There is known a patent document that discloses a mechanical structure that adjusts the passage of air inside an audio device. Korean Patent Application Publication No. 10-2011-0125346 discloses an air control device that includes a rotation plate and a plurality of elongated holes between the back of an earphone and a rear cover and controls the quantity of air flow, and is intended to adjust the amounts of change in the tones of high and low sounds. Korean Patent No. 10-1955108 discloses a switch-type air control valve that is mounted on the speaker of a mobile device. The turning on/off of the valve is adjusted according to the distance between the mobile device and a user, i.e., the volume of sound is increased as the distance from the user increases.

Meanwhile, modern true wireless stereo (TWS) canal-type structures are divided into two types: the type in which there is air flow from an eardrum to the outside; and the type in which there is no air flow when a user wears it. When there is no air flow, the user feels stuffy. In contrast, when there is air flow, external sound can easily enter the eardrum, can interfere with sound pressure and TWS functionality. Therefore, it is desirable to allow the user or TWS functionality to automatically switch between open and closed modes.

SUMMARY

An object of the present invention is to provide an audio device equipped with an air flow control valve that can selectively open and close a passage to block or allow external sound and can adjust the quantity of air flow.

According to an aspect of the present invention, there is provided a true wireless stereo (TWS) speaker, wherein the appearance of the TWS speaker is formed of a housing, a first vent hole is formed in a front surface of the housing and a second vent hole is formed in a side surface of the housing, an inside of the housing is divided into an upper space and a lower space by a bracket disposed across a longitudinal direction, a driver is disposed on one side of the lower space, and a sound emission portion is provided to a front to communicate with the driver; wherein the driver is supported by a partition wall on a side opposite to the sound emitting portion and is blocked from the lower space, and a forward vibration sound of the driver is emitted through the sound emitting portion without leaking into the lower space; wherein the second vent hole is formed in a side surface of the lower space, so that external sound coming through the second vent hole is blocked from being merged with the vibration sound of the driver, and the external sound flows in through the first vent hole at a front location; and wherein an air flow control valve structure is formed to surround the first vent hole and selectively controls opening and closing for external sound.

The air flow control valve structure may include a valve housing, and a piezoelectric valve disposed inside the valve housing.

The air flow control valve structure may include a valve housing provided with a side surface and edge surrounding the first vent hole and an open top surface forming the remaining portion, a first flap formed on the side surface, and a second flap formed on another side surface to face the first flap.

The air flow control valve structure may be in any one of: (A) a closed state for external sound in which the first flap and the second flap maintain a plane parallel to the lower surface of the housing, and ends of the two flaps are completely in contact with each other to maintain airtightness; (B) an intermediate open state for external sound in which the first and second flaps are simultaneously rotated up or down by a same angle and thus a small gap is formed between the ends of the two flaps; and (C) a completely open state for external sound in which the first flap is rotated up or down and the second flap is rotated in an opposite direction and thus a large gap is formed between the ends of the two flaps; and, in the open states (B) and (C), the external sound passes through the first vent hole and the open portion of the top surface of the valve housing and is emitted to the sound emission portion.

According to another aspect of the present invention, there is provided a true wireless stereo (TWS) speaker, wherein the appearance of the TWS speaker is formed of a housing, a second vent hole is formed in a side surface of the housing, an inside of the housing is divided into an upper space and a lower space by a bracket disposed across a longitudinal direction, a driver is disposed on one side of the lower space, and a sound emission portion is provided to a front to communicate with the driver; wherein a second plate-shaped bracket is disposed between both side surfaces of the driver and an inner wall of the housing, and forward vibration sound of the driver is emitted through the sound emission portion without leaking into the lower space; and wherein a central vent hole is formed in a bottom surface of the second bracket, and an air flow control valve structure is formed to surround the central vent hole and selectively control opening and closing for external sound coming through the second vent hole formed in the side surface of the lower space.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

Figure 1:
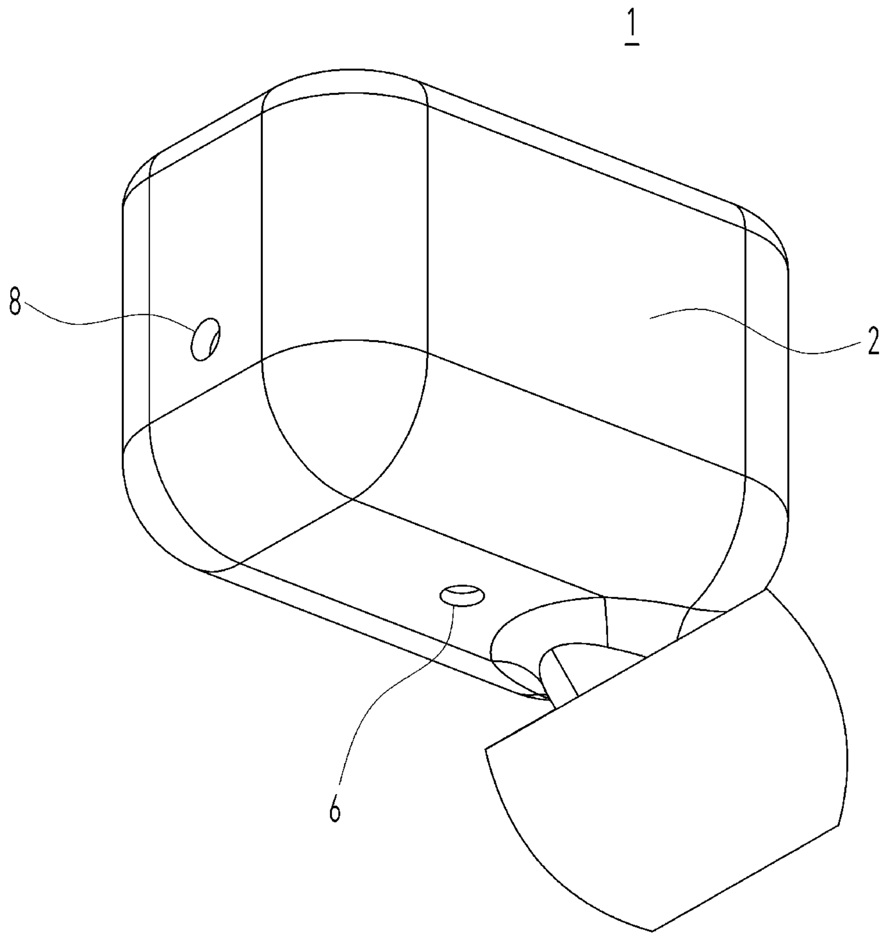
FIG. 1 is an overall perspective view of a TWS speaker to which the air flow control structure of the present invention is applied.

FIG. 1 is an overall perspective view of a TWS speaker 1 to which the air flow control structure of the present invention is applied. The appearance of the TWS speaker 1 is formed of a housing 2 that is configured in an approximately rectangular hexahedral shape. An ear tip covers a sound emission passage on one side of the bottom surface of the housing 2. The TWS speaker 1 has two vent holes 6 and 8. The first vent hole 6 is formed near the center of the front surface of the housing 2 (the side where vibration sound travels toward a user's external auditory canal). The second vent hole 8 is formed at a slightly lower location of a side surface of the housing 2. The present invention selectively blocks and allows the inflow of external sound from the first vent hole 6 or the second vent hole 8 by using a piezoelectric valve.

Figure 2:
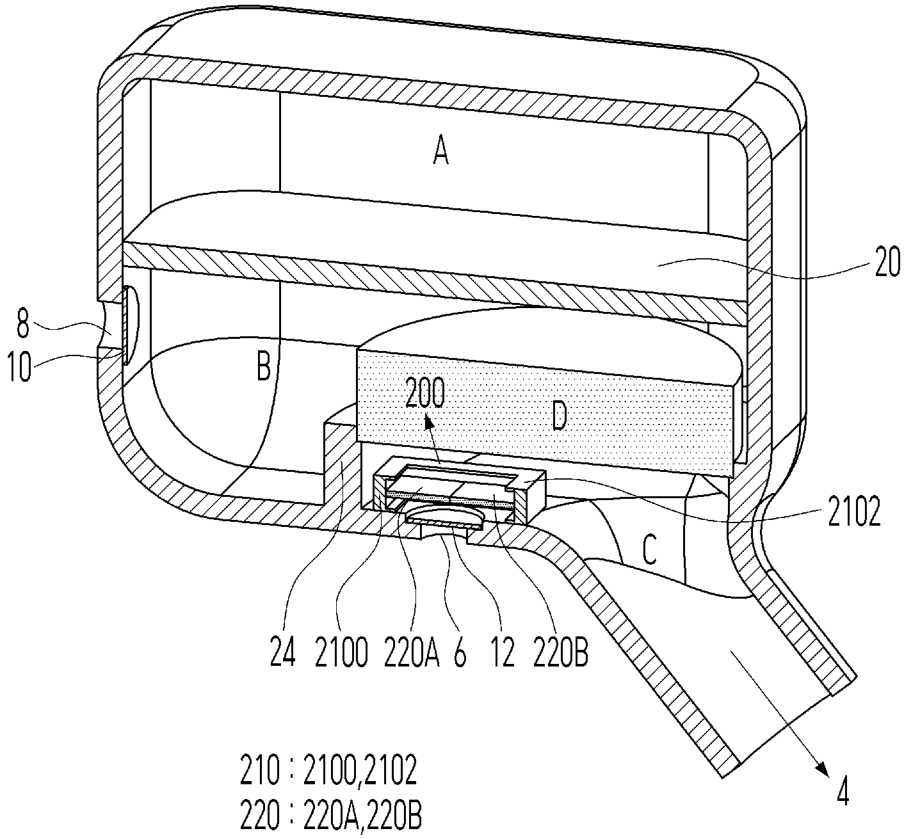
FIG. 2 is a longitudinal sectional view of the TWS speaker of FIG. 1.

FIG. 2 is a longitudinal sectional view of the TWS speaker 1 of FIG. 1.

The inside of the housing 2 of the TWS speaker 1 is divided into an upper space A and a lower space B by a bracket 20 that is a partition wall disposed across the longitudinal direction near the approximately intermediate height of the housing 2. Devices and elements for a TWS device, such as a battery and hardware, are placed in the upper space A. The driver D of the speaker is installed in the lower portion of one side of the lower space B. A sound emission portion 4 is provided to communicate with the driver D. The vibration sound of the diaphragm (not shown) of the driver D is transferred to the user's external auditory canal through the outlet of the sound emission portion 4. The driver D is supported by a partition wall 24 on the side opposite to the sound emission portion 4 and is blocked from the lower space B, and the forward vibration sound of the driver D is emitted through the sound emission portion 4 without leaking into the lower space B.

The above-described second vent hole 8 is formed in a side surface of the lower space B. A second mesh 10 is installed over the second vent hole 8. The first vent hole 6 is formed near the center of the bottom surface of the housing 2, specifically between the partition wall 24 and the inlet of the sound emission portion 4. A first mesh 12 is installed to cover the first vent hole 6. The first vent hole 6 is formed on the side facing the user, in which case the first vent hole 6 is formed in the "front" or "front side" of the housing 2.

In the present invention, a front space C separated from the lower space B is formed by the driver D and the partition wall 24. The front space C is a space open downward (forward) because it is separated from the lower space B by the boundary formed by the partition wall 24 and the lowermost surface of the driver D but includes the sound emission portion 4.

The present invention is characterized in that there is provided a valve structure 200 surrounding the first vent hole 6. The valve structure 200 is an air flow control valve in the present invention. The valve structure 200 includes a valve housing 210, and a piezoelectric valve 220 installed inside the valve housing 210. The valve housing 210 includes a side surface 2100 and a top surface 2102. The side surface 2100 is erected to surround the first vent hole 6, and the top surface 2102 is formed of an edge and is mostly open. The piezoelectric valve 220 includes a first flap 220A formed on one side surface 2100, and a second flap 220B formed on the other side surface 2100 to face the first flap 220A. Piezoelectric elements are mounted or stacked in the actuator (not shown) of the piezoelectric valve 220. When the piezoelectric elements are displaced by the energization of the actuator, the first flap 220A or the second flap 220B may be moved in response to the reception of driving force due to the deformation. The opening/closing structure of a valve using piezoelectric elements is disclosed, e.g., in Korean Patent Application Publication No. 10-2022-0027962. Piezoelectric valves correspond to a relatively recently developed technology and are being used in many fields. In particular, such a piezoelectric valve is advantageous in that it is precise because it allows the adjustment of the amount of opening/closing on a per micrometer unit basis and a proportional flow control valve that can finely adjust the degree of opening in proportion to the current can also be implemented. Accordingly, it is preferable that the valve structure 200 of the present invention uses a piezoelectric valve 200. However, it may also be possible to use a common pneumatic or solenoid valve.

In FIG. 2, the first flap 220A and the second flap 220B maintain a straight shape parallel to the bottom surface of the housing 2 without being off-centered upward or downward. Furthermore, the ends of the two flaps are completely in contact with each other and form a closed state that maintains airtightness. In this state, even when external sound flows in through the first vent hole 6, it is blocked by the side surface 2100 and the first and second flaps A and B, so that it can no longer flow inward. Furthermore, external sound flowing in through the second vent hole 8 is blocked by the driver D and the partition wall 24. Accordingly, a user can listen to the TWS speaker 1 without interference from external sound.

Figure 3:
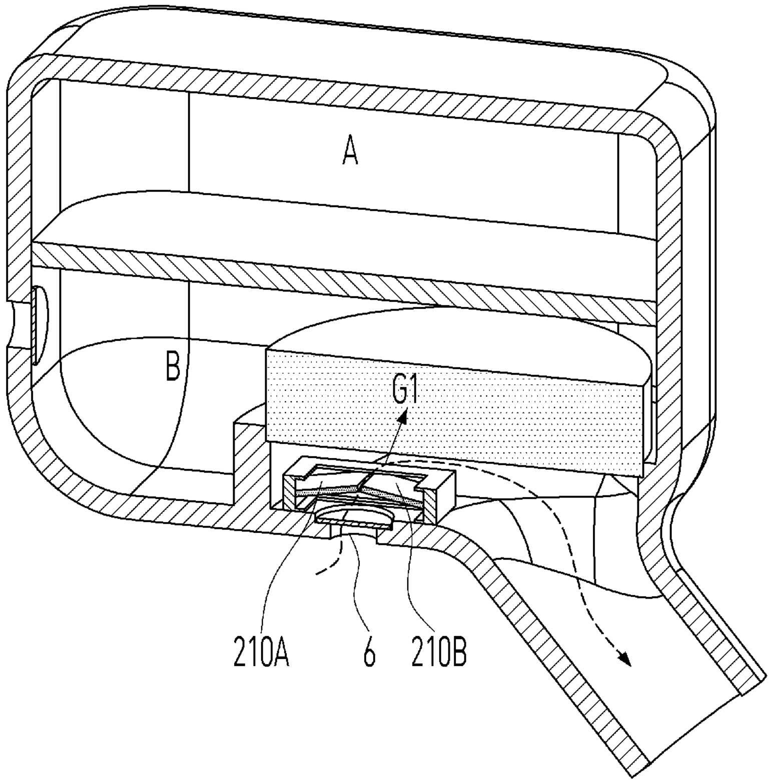
FIG. 3 is a diagram showing an intermediately open stage for external sound in FIG. 2.

FIG. 3 is a diagram showing an intermediately open stage for external sound in FIG. 2.

In the intermediate stage in which overall external sound is not blocked but a sound passage is not all open, the first flap 220A and the second flap 220B are simultaneously rotated upward by the same angle, as shown in the drawing. A small gap G1 is formed between the ends of the two flaps. In this state, when external sound flows in through the first vent hole 6, it passes through the gap G1 formed between the first and second flaps A and B, then passes through the opening of the top surface 2102 and is finally transmitted to a user's external auditory canal through the sound emission portion 4. The external sound transmitted is not the noise heard from outside, but is sound having a reduced volume.

Unlike in the above example, both the first and second flaps 220A and 220B may be rotated downward. Alternatively, the position of one of the two flaps may be fixed, and the remaining flap may be rotated up or down.

Figure 4:
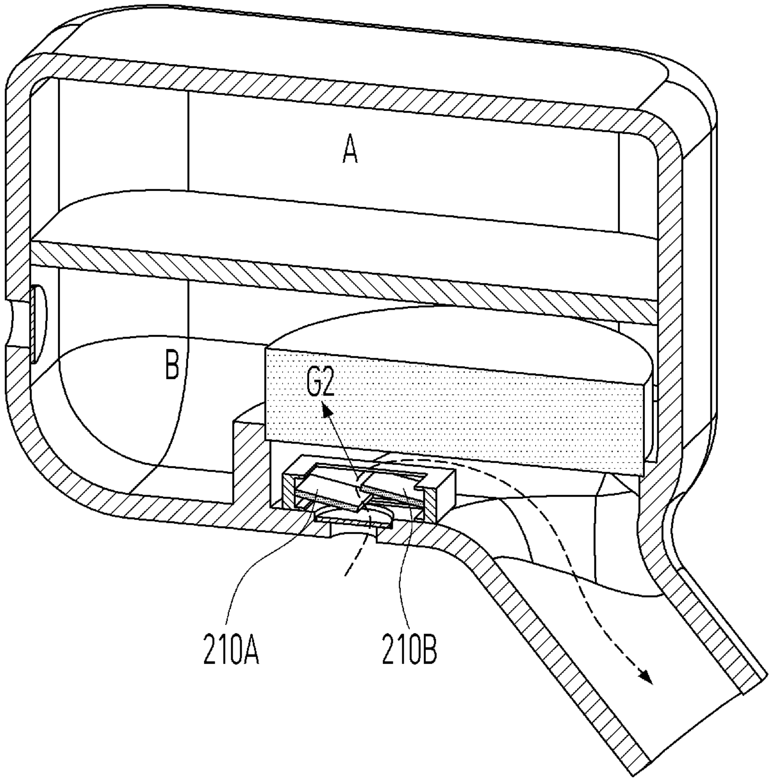
FIG. 4 is a diagram showing a completely open stage for external sound in FIG. 2.

FIG. 4 is a diagram showing a completely open stage for external sound in FIG. 2.

In the stage in which a sound passage is open for overall external sound, the first flap 220A is rotated downward and the second flap 220B is rotated upward, as shown in the drawing. A large gap G2 is formed between the ends of the two flaps. In this state, when external sound flows in through the first vent hole 6, it passes through the gap G2 formed between the first and second flaps A and B, then passes through the opening of the top surface 2102, and is transmitted to a user's external auditory canal through the sound emission portion 4. The external sound transmitted is less than the noise heard from outside, but the maximum volume thereof is higher than the sound pressure in a closed or semi-open state.

Unlike in the above example, the first flap 220A may be rotated upward, and the second flap 220B may be rotated downward. Furthermore, although the flap rotation type has been described above, a structure in which the open area between the two members is adjusted in such a manner that the first flap 220A and the second flap 220B are selectively moved adjacent to each other or spaced apart from each other on the same plane is also possible.

In addition, the intermediately open stage does not necessarily mean a single stage. The degree of valve opening may be changed according to the performance and operation of the TWS or audio, and multiple intermediately open stages may be set up.

Next, as a second embodiment of the present invention, an external sound air flow structure will be described with reference to FIG. 5. In the present embodiment, the TWS speaker 1 does not have a first vent hole 6 in the front surface thereof, and only a second vent hole 8 is formed in a side surface thereof.

A plate-shaped second bracket 30 is disposed between both sides of a driver D and the inner wall of a housing 2. The second bracket 30 is installed slightly below the front surface (lowest bottom) of the driver D and at a height that completely exposes the second vent hole 8 in order to prevent interference with the sound emission of the driver D. Due to the second bracket 30, a front space C is further expanded upward than that of the previous embodiment.

A central vent hole 40 is formed approximately near the center of the bottom surface of the second bracket 30. A central mesh is disposed to cover the central vent hole 40. In the same manner as that of the previous embodiment, a valve structure 200 surrounding the central vent hole 40 is provided. The valve structure 200 includes a valve housing 210, and a piezoelectric valve 220 disposed inside the valve housing 210. Since these components are the same as those of the above-described embodiment, detailed descriptions thereof are omitted.

Figure 5:
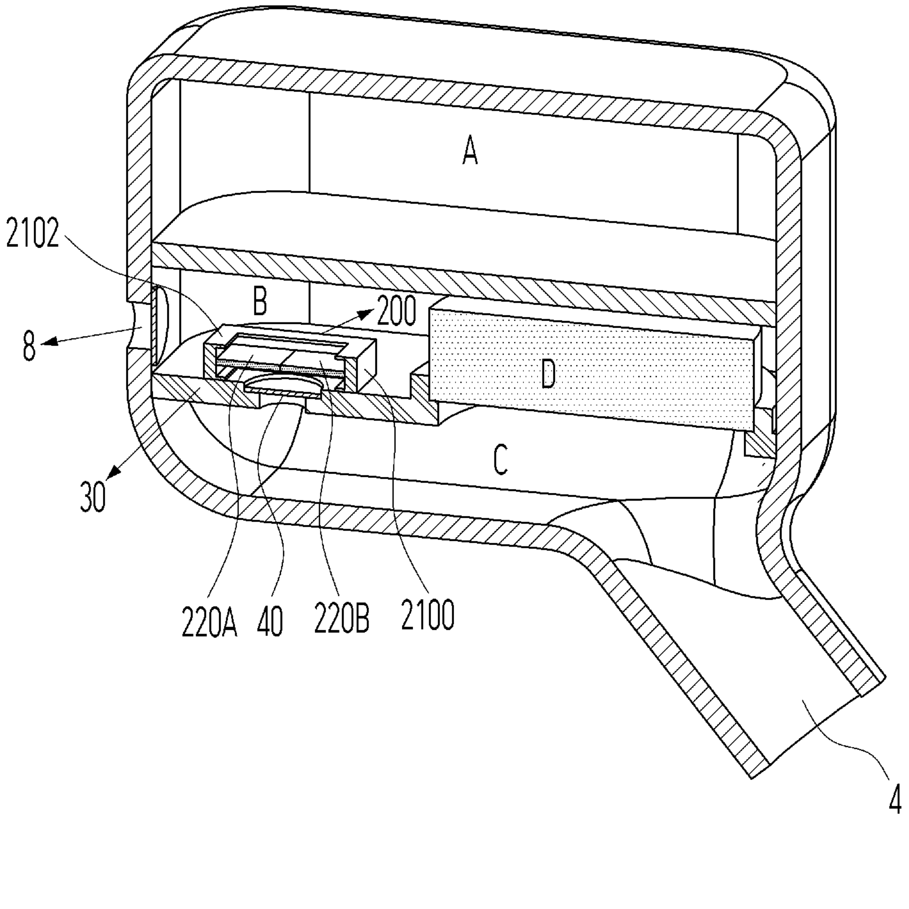
FIG. 5 is a longitudinal sectional view of a TWS speaker according to a second embodiment of the present invention.

In FIG. 5, the first flap 220A and the second flap 220B maintain a straight shape parallel to the bottom surface of the housing 2 without being off-centered upward or downward, and form a closed state in which the ends of the two flaps are completely in contact with each other and maintain airtightness.

Figure 6:
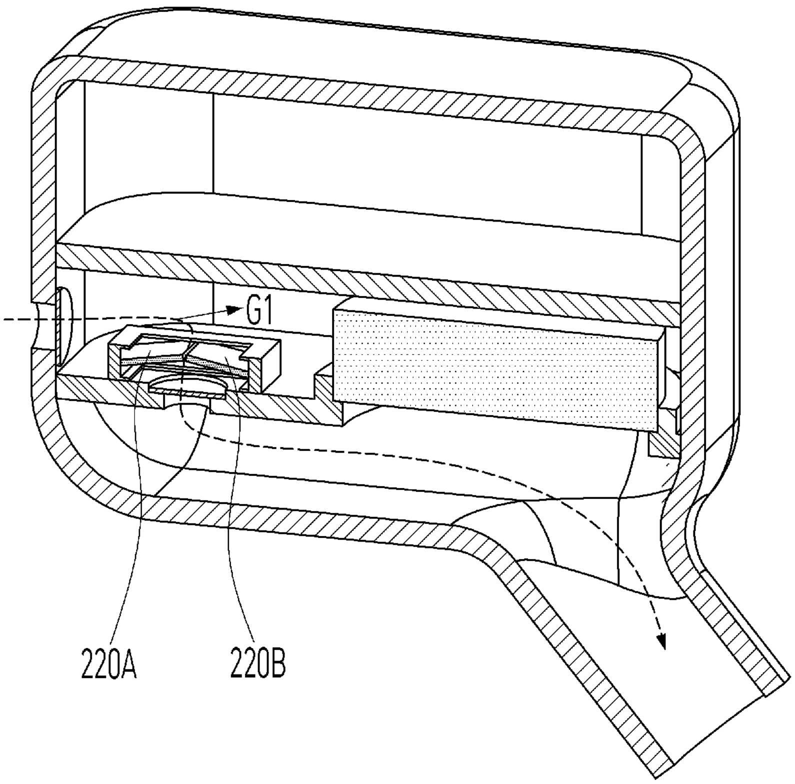
FIG. 6 is a diagram showing an intermediately open stage for external sound in FIG. 5.

FIG. 6 is a diagram showing an intermediately open stage for external sound in FIG. 5.

In the intermediate stage in which overall external sound is not blocked but a sound passage is not all open, the first flap 220A and the second flap 220B are simultaneously rotated upward by the same angle and form a small gap G1 between the ends of the two flaps.

Figure 7:
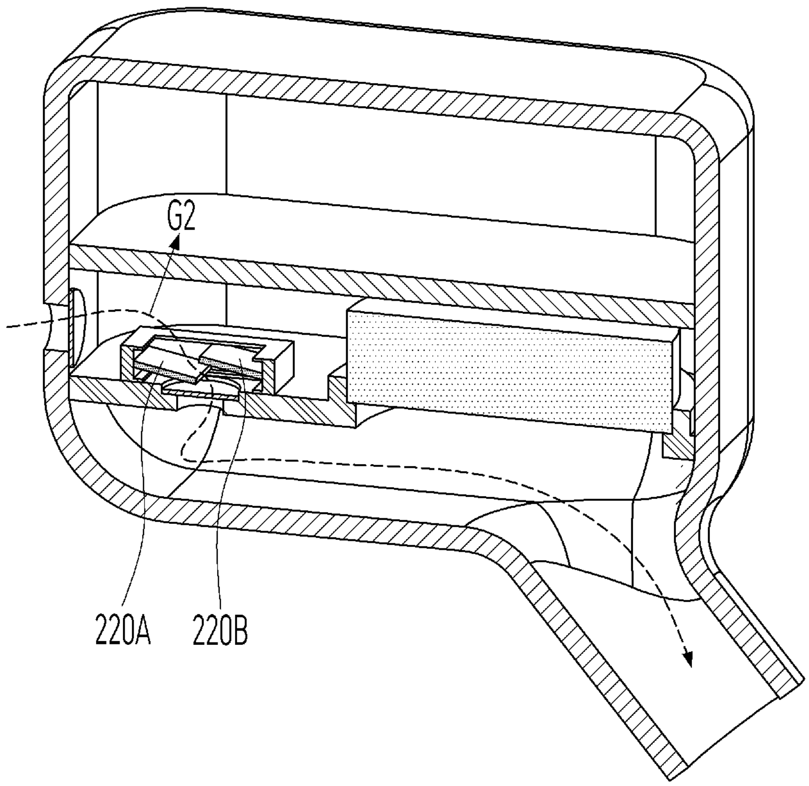
FIG. 7 is a diagram showing a completely open stage for external sound in FIG. 5.

FIG. 7 is a diagram showing a completely open stage for external sound in FIG. 5.

In the stage in which a sound passage is open for overall external sound, the first flap 220A is rotated downward and the second flap 220B is rotated upward, thereby forming a large gap G2 between the ends of the two flaps, as shown in the drawing.

The air flow function for external sound of FIGS. 5 to 7 is the same as the above-described embodiment except for the order in which external sound first passes through the open top surface of the valve housing 210 and then flows into the central vent hole 40. Accordingly, a detailed description thereof is omitted.

In any embodiment of the present invention, there is used a structure in which the flow of external sound is formed inside the front space C and the external sound is merged with the vibration sound of the driver D.

Figure 8:
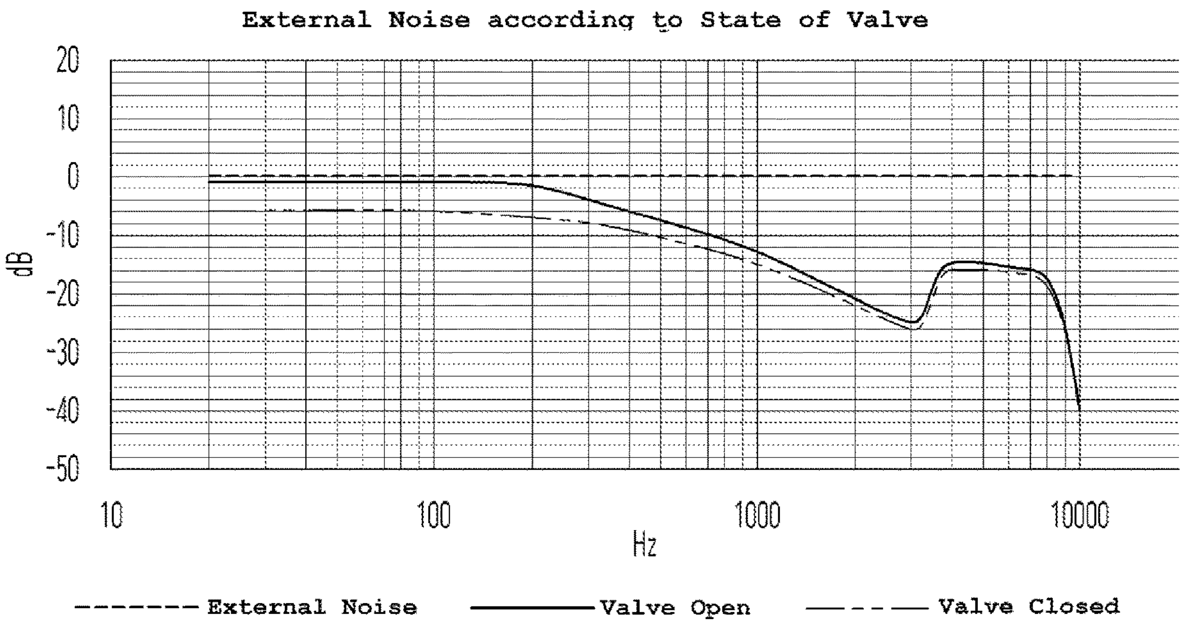
FIG. 8 is a frequency-sound pressure graph for external sound before and after the application of the valve mechanism of the present invention.

FIG. 8 is a frequency-sound pressure graph in the case where the valve structure of the present invention of the first embodiment is applied to a TWS speaker when external noise is set to a reference decibel.

It can be seen that in the closed state of the valve, the sound pressure of external sound decreases across all frequency ranges and a reduction effect increases as the frequency increases. It can be seen that in the open state, the sound pressure reduction effect is lower than that in the closed state, the external sound in the low frequency range is almost similar to external noise, and the reduction effect increases as the frequency increases. It is expected that the negative pressure graph in the intermediate half-open state will be located between the valve open state graph and the valve closed state graph and the same flow is exhibited in a qualitative perspective.

According to the present invention, the flaps of the valve mechanism are driven to adjust the quantity of air flow, thereby achieving maximum performance and effect under necessary conditions.

In an ANC mode, the valve mechanism is sealed to prevent external noise from being heard, and, in a transparency mode, an appropriate quantity of air flow is obtained through adjustment by the flaps when necessary so that external noise can be easily heard, which provides the effect of being useful in audio and TWS.

Although the embodiments of the present invention have been described above, it is obvious that various changes and modifications may be made to the present invention and that the scope of the rights of the present invention extends to an identical or equivalent range as the claims to be described below.

What is claimed is:

1. A true wireless stereo (TWS) speaker, wherein an appearance of the TWS speaker is formed of a housing, a first vent hole is formed in a front surface of the housing and a second vent hole is formed in a side surface of the housing, an inside of the housing is divided into an upper space and a lower space by a bracket disposed across a longitudinal direction, a driver is disposed on one side of the lower space, and a sound emission portion is provided to a front to communicate with the driver;

wherein the driver is supported by a partition wall on a side opposite to the sound emitting portion and is blocked from the lower space, and a forward vibration sound of the driver is emitted through the sound emitting portion without leaking into the lower space;

wherein the second vent hole is formed in a side surface of the lower space, so that external sound coming through the second vent hole is blocked from being merged with the vibration sound of the driver, and the external sound flows in through the first vent hole at a front location; and wherein an air flow control valve structure is formed to surround the first vent hole and selectively controls opening and closing for external sound.

2. The TWS speaker of claim 1, wherein the air flow control valve structure includes a valve housing, and a piezoelectric valve disposed inside the valve housing.

3. The TWS speaker of claim 1, wherein the air flow control valve structure includes a valve housing provided with a side surface and edge surrounding the first vent hole and an open top surface forming a remaining portion, a first flap formed on the side surface, and a second flap formed on another side surface to face the first flap.

4. The TWS speaker of claim 3, wherein:

the air flow control valve structure is in any one of:

(A) a closed state for external sound in which the first flap and the second flap maintain a plane parallel to the lower surface of the housing, and ends of the two flaps are completely in contact with each other to maintain airtightness;

(B) an intermediate open state for external sound in which the first and second flaps are simultaneously rotated up or down by a same angle and thus a small gap is formed between the ends of the two flaps; and (C) a completely open state for external sound in which the first flap is rotated up or down and the second flap is rotated in an opposite direction and thus a large gap is formed between the ends of the two flaps; and in the open states (B) and (C), the external sound passes through the first vent hole and an open portion of a top surface of the valve housing and is emitted to the sound emission portion.

5. A true wireless stereo (TWS) speaker, wherein an appearance of the TWS speaker is formed of a housing, a second vent hole is formed in a side surface of the housing, an inside of the housing is divided into an upper space and a lower space by a bracket disposed across a longitudinal direction, a driver is disposed on one side of the lower space, and a sound emission portion is provided to a front to communicate with the driver;

wherein a second plate-shaped bracket is disposed between both side surfaces of the driver and an inner wall of the housing, and forward vibration sound of the driver is emitted through the sound emission portion without leaking into the lower space; and wherein a central vent hole is formed in a bottom surface of the second bracket, and an air flow control valve structure is formed to surround the central vent hole and selectively control opening and closing for external sound coming through the second vent hole formed in the side surface of the lower space.

6. The TWS speaker of claim 5, wherein the air flow control valve structure includes a valve housing, and a piezoelectric valve disposed inside the valve housing.

7. The TWS speaker of claim 6, wherein the air flow control valve structure includes a valve housing provided with a side surface and an edge being erected to surround the central vent hole and an open top surface forming a remaining portion, a first flap formed on the side surface, and a second flap formed on another side surface to face the first flap.

8. The TWS speaker of claim 7, wherein:

the air flow control valve structure is in any one of:

(A) a closed state for external sound in which the first flap and the second flap maintain a plane parallel to the lower surface of the housing, and ends of the two flaps are completely in contact with each other to maintain airtightness;

(B) an intermediate open state for external sound in which the first and second flaps are simultaneously rotated up or down by a same angle and thus a small gap is formed between the ends of the two flaps; and (C) a completely open state for external sound in which the first flap is rotated up or down and the second flap is rotated in an opposite direction and thus a large gap is formed between the ends of the two flaps; and in the open states (B) and (C), the external sound passes through the first vent hole and an open portion of a top surface of the valve housing and is emitted to the sound emission portion.

* * * * *